Patented Mar. 10, 1931

1,796,170

UNITED STATES PATENT OFFICE

CHARLES O. TERWILLIGER, OF MOUNT VERNON, NEW YORK, ASSIGNOR TO WARD LEONARD ELECTRIC COMPANY, A CORPORATION OF NEW YORK

PROCESS OF EXTRACTING ZIRCONIA FROM ORES

No Drawing.        Application filed May 18, 1929.  Serial No. 364,323.

This invention relates to the process of separating or extracting zirconia ($ZrO_2$) from zircon ($ZrSiO_4$) and zirconia bearing ores and minerals.

The ores and minerals containing zirconia, especially baddeleyite, invariably contain many substances which are ordinarily difficult and expensive to remove by the present methods. These ores contain large amounts of the oxides of iron and varying amounts of the oxides of titanium, sodium, potassium, magnesium, calcium, aluminum, lead, tin, uranium, erbium, zinc, copper, bismuth, manganese, cobalt and nickel.

The object of this invention is to remove by a comparatively simple and economical process sufficient amounts of the various impurities contained in the ores so as to obtain zirconia in a pure white form for the purpose of using the product in the manufacture of refractories, vitreous enamels and for other purposes.

In the process the ores are first crushed and thereafter by any flotation method appreciable amounts of dirt and other foreign substances are removed. The crushed ore is then ground to a powder that will pass through a 350 mesh screen or finer and thereafter treated with inorganic acids of such strength that they will not dissolve the zirconia, or may be ground in the presence of inorganic acids that will dissolve the impurities without appreciably attacking the zirconia. In carrying out the process different acids may be used, such as sulphuric, hydrocloric and hydrofluoric or mixtures of two or more of the acids.

While zircon ($ZrSiO_4$) does not vary much in its impurities other than an excess of the theoretical amount of silica, the ore baddeleyite varies considerably, not only in its chemical composition but also in its physical properties. When treating baddeleyite with acid or acids it may be advantageous to first use either sulphuric or hydrochloric, depending upon, as aforesaid, the nature of the ore, but in no case should the acid be of sufficient strength to dissolve the zirconia. A particularly dense baddeleyite ore may be given a preliminary treatment with sulphuric acid and then followed by a treatment with hydrochloric acid. This dual treatment will remove all but traces of the impurities except silica.

The silica is now removed by treating the residue with hydrofluoric acid to which a sufficient amount of sulphuric acid is added to prevent volatilization of the zirconia. This mixture of hydrofluoric and sulphuric acid with the impure zirconia is heated to the proper temperature to volatilize the silica as silicon fluoride.

After the acids have acted sufficiently upon the ores in powdered form they are removed by decantation or filtration. The residue, after removal of the acids, is then washed, the resulting product being zirconia which, when derived from some ores, is now pure white containing but traces of impurities and can be used as a refractory. With some ores it is necessary at this stage to calcine the product to remove any volatile matter. I find that certain ores require a still further chemical treatment, such as heating with hydrochloric acid in the presence of free chlorine, or any combination of acids that will liberate free chlorine, but not of sufficient strength to dissolve the zirconia. After such treatment the material is then separated from the acid or acids, washed, if necessary, and may be calcined to remove any volatile matter. Zirconia produced by this process can also be used as an opacifying agent in the manufacture of vitreous enamels, being quite free from iron and pure white.

The carrying out of the process may be explained in more detailed manner by the following examples with the use of the well-known ball mill, after first crushing the ore and removing dirt and other foreign substances by any flotation method.

Into the mixing chamber of the mill approximately 100 pounds of crude baddeleyite in granular form is introduced. To this is added an equal weight of sulphuric acid of approximately 45° Bé. strength. The mill is now started, heat applied to approximately 120° C. and grinding is continued until the ore will all pass through a 350 mesh screen. Most of the impurities are now in the acid solution and these may be removed by decantation or filtration and the residue washed with water. This residue calculated as dry weight is now treated with hydrochloric acid of approximately 18° Bé. strength and heated to just under a boil. This operation is continued preferably with agitation until all traces of the impurities are removed. Practically all of the impurities except silica have been taken up by the acid. The acid is removed again by decantation or filtration and the residue washed thoroughly with water. The residue is now found to be either pure white or with a slightly yellowish tinge depending upon the particular character of the ore treated. If it is of a yellowish tinge, iron is still present and this may be removed by a subsequent treatment with hydrochloric acid of the same strength of the previous treatment and under the same conditions but in the presence of free chlorine. The chlorine may be introduced as gas from containers of liquid chlorine, or compounds may be introduced in the hydrochloric acid which will liberate free chlorine. The acid is now removed as aforesaid and the residue carefully washed with water and is now found to be pure white.

Silica is still in this pure white residue and is removed by a treatment with hydrofluoric acid of 48% strength to which has been added a little sulphuric acid to prevent volatilizing the zirconia, but the acid must not be of sufficient strength to dissolve the zirconia. The mixture is heated sufficiently to volatilize the silica as silicon fluoride, which will usually occur at about 110° C. The residue is afterwards separated from the acid solution and washed.

Zircon may be treated in substantially the same manner as the baddeleyite, although the preliminary treatment with sulphuric acid is not always necessary. However, with one grade of zircon which is contained in the beach sands along the coast of certain parts of Brazil, the preliminary sulphuric acid treatment has been found advantageous.

Due to the varying chemical composition and physical condition of these zirconium bearing ores, the strength of the acids used that will remove impurities and still not dissolve the zirconia, vary considerably. It is desirable to use as strong an acid as possible and in sufficient amount to remove the impurities soluble in these acids, without actually dissolving the zirconia. It is further understood than when using hydrochloric acid, it would be undesirable to heat the mixture to a temperature that would cause the HCl to be lost through volatilization.

Previous processes for obtaining zirconia free from impurities, during some stage dissolve the zirconia and later on precipitate it free from the impurities. According to the present invention there is no stage of the process during which the zirconia is put in solution.

I claim:

1. The process of obtaining zirconia from ores which comprises finely grinding the ore, treating with hydrochloric acid of such strength as to dissolve impurities without dissolving the zirconia, and then removing the solution and washing the residue.

2. The process of obtaining zirconia from ores which comprises finely grinding the ore, treating with sulphuric acid of such strength as to dissolve impurities without dissolving the zirconia, removing the solution, treating the residue with hydrochloric acid of such strength as to dissolve impurities without dissolving the zirconia, and then removing the solution and washing the residue.

3. The process of obtaining zirconia from ores which comprises finely grinding the ore, treating with sulphuric acid of such strength as to dissolve impurities without dissolving the zirconia, removing the solution, treating the residue with hydrochloric acid of such strength as to dissolve impurities without dissolving the zirconia, removing the solution and washing the residue, and then calcining the residue.

4. The process of obtaining zirconia from ores which comprises finely grinding the ore, treating with acid of such strength as to dissolve impurities without dissolving the zirconia, treating with hydrochloric acid in the presence of free chlorine, and then removing the solution and washing the residue.

5. The process of obtaining zirconia from ores which comprises finely grinding the ore, treating with acid of such strength as to dissolve impurities without dissolving the zirconia, removing the solution, and treating with hydrofluoric acid to volatilize the silicia.

6. The process of obtaining zirconia from ores which comprises finely grinding the ore, treating with acid of such strength as to dissolve impurities without dissolving the zirconia, removing the solution, and treating with hydrofluoric acid and sulphuric acid to volatilize the silica.

7. The process of obtaining zirconia from ores which comprises finely grinding the ore, treating with acid of such strength as to dissolve impurities without dissolving the zirconia, removing the solution, treating with hydrofluoric acid and sulphuric acid and heating the mixture, and then separating and washing the residue.

8. The process of obtaining zirconia from ores which comprises finely grinding the ore, treating with sulphuric acid, removing the solution, treating with hydrochloric acid, removing the solution, treating with hydrochloric acid in the presence of free chlorine, removing the solution, treating with hydrofluoric acid and sulphuric acid and heating the mixture, and then separating, washing and calcining the residue, the strength of the acids in each step being such as to act upon the impurities without dissolving the zirconia.

CHARLES O. TERWILLIGER.